Sept. 12, 1933.  B. F. DOOLEY, JR  1,926,515
RECOVERY OF SPENT TREATING REAGENTS
Filed Sept. 24, 1930
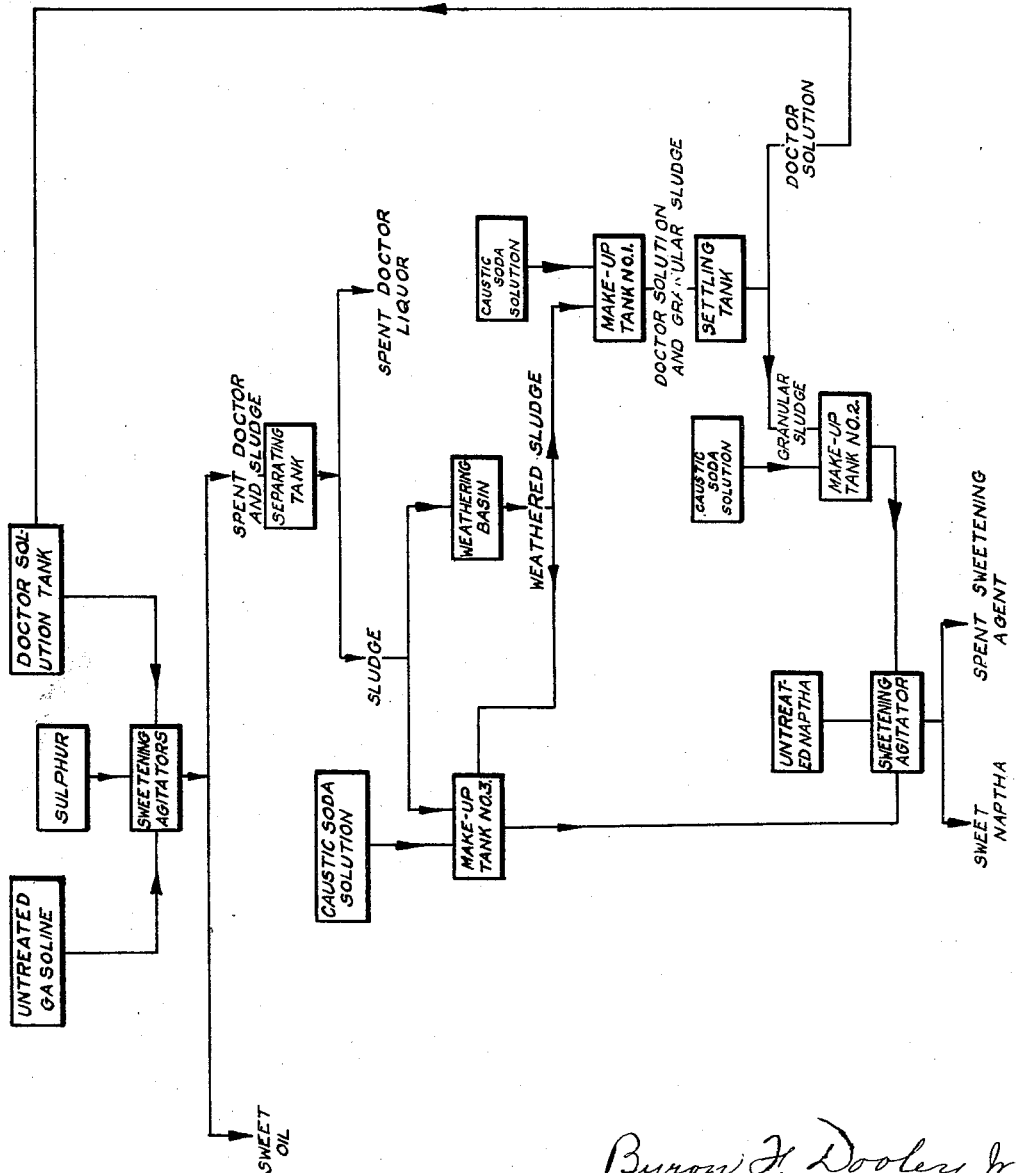

Patented Sept. 12, 1933

1,926,515

UNITED STATES PATENT OFFICE 1,926,515

RECOVERY OF SPENT TREATING REAGENTS

Byron F. Dooley, Jr., Port Arthur, Tex., assignor to The Texas Company, New York, N. Y., a corporation of Delaware Application September 24, 1930
Serial No. 484,152

11 Claims. (Cl. 23—51)

My invention relates to the recovery of valuable products from spent treating reagents in petroleum refineries, and more particularly involves the recovery of valuable compounds from the lead sludge which results from the treatment of certain petroleum distillates with sodium plumbite.

In carrying out my invention, I take advantage of the susceptibility of the lead sludge to undergo certain chemical changes when exposed to the atmosphere. By weathering the sludge in a suitable manner, I am able to convert the lead compounds to a form that can be dissolved or suspended in aqueous caustic soda and reused as a treating reagent for petroleum oils.

Most petroleum distillates, especially the lighter fractions, such as gasoline, naphtha and kerosene contain sulphur compounds, which give them a disagreeable odor and renders them unsuitable for market. These compounds are removed or converted into a less objectionable form by sweetening with an alkaline solution of sodium plumbite and, if necessary, with additions of free sulphur to complete the reaction. The reaction of the sodium plumbite or doctor solution, as it is known in the trade, with sulphur compounds in the oil converts them into complex lead derivatives which in the presence of free sulphur precipitates a lead sludge. The precipitate, consisting chiefly of a suspension of lead sulphide in the spent doctor solution, accumulates as a waste material in considerable quantities in refineries where large volumes of oil are treated.

The sludge produced in the manner indicated above was formerly settled from the caustic liquor and run to the sewer or otherwise disposed of as a waste product in the most convenient manner. As a result, the lead content of the sludge was a complete loss which increased the treating cost and reflected in the price of the finished products. More recently several methods have been developed for the recovery of this sludge from spent doctor. The details of the different methods will not be given, but it may be mentioned that they consist fundamentally of certain processes by which the lead sulphide is converted into compounds which are soluble in caustic soda and can be reused in a sweetening solution. The processes comprise, briefly, such steps as roasting, or conversion of the lead sulphide to lead sulphate by sulphuric acid, or blowing a spent doctor solution at an elevated temperature with an oxidizing gas. All of these methods are obviously more or less expensive and some of them quite complicated.

I have discovered that artificial methods are unnecessary and that the lead sludge can be converted to valuable products in a simple and efficient manner if proper conditions are provided for the material to undergo conversion in the atmosphere. This conversion takes place under weathering conditions and since the process is inherently a result of natural agencies, the cost is practically nil.

More particularly, in accordance with my invention, a light petroleum oil is treated with sodium plumbite to sweeten the oil and precipitate lead sludge in the spent solution. The sludge is then separated from the spent solution and delivered to a weathering pit or basin in the ground. As the sludge weathers, the lead compounds are converted into compounds soluble in alkali and the insoluble compounds are changed to a granular form. The soluble compounds are dissolved in caustic alkali and the solution reused as a doctor solution or the soluble compounds may be dissolved, the solution decanted and the insoluble granular material suspended in caustic soda to be used as a treating agent.

A reaction has been found to spontaneously set in when the sludge is exposed to sunlight and varying weather conditions, which proceeds more or less rapidly, depending on conditions. Without going into the theory of the reaction that takes place as the solution is exposed to the atmosphere, it is sufficient to say that it is thought to involve primarily autoxidation of the lead sulphide to oxygenated compounds. Consistent with this suggestion of the type of reaction, it has been noted that in some instances sunlight is very desirable. Another favorable condition is a finely precipitated sludge whereby large exposed surfaces are produced. It has also been suggested that certain reaction products which are absorbed by the sludge during the sweetening operation may be important to the success of the reaction.

While the reaction may be satisfactorily realized in earthen pits, I have also found it to be of considerable advantage to employ shallow pans into which the sludge, together with sufficient of the spent solution or liquor to form a slurry, may be disposed and subjected to weathering with occasional or slow continuous stirring. When weathering the sludge in this way in the presence of a small amount of the expended caustic containing solution upwards of 40 or 45 percent of the sludge may be converted into the soluble form. The presence of the liquor appears to exercise a catalytic effect upon the reaction whereby the reaction rate is approximately double that ordinarily occurring in an earthen pit during the same period of time.

A liquid tight pan is of course of further advantage in that it avoids the otherwise washing away and soakage of some of the valuable materials into the ground.

The time required for a substantial conversion of the sludge will necessarily vary, since the weather conditions are not constant. It is not so extensive, however, as to cause difficulty. Thus, during a period of one month's exposure in an earthen pit as much as 20 percent of the sludge has been converted to compounds soluble in caustic.

In refineries where large quantities of litharge are consumed in the sweetening operation, a considerable lake of sludge may accumulate, and after a considerable supply has once accumulated, it is apparent that the process may be continuous, for while no definite amount must necessarily be converted, yet in large deposits, a sufficient time would be insured to produce the desired results.

The quantity of the weathered sludge to produce a sweetening reagent depends on the degree of conversion. In large deposits where the time of exposure has been extensive, it has been found that 15 to 20 pounds of the sludge per barrel of alkali produces a satisfactory sweetening reagent when the sludge was dissolved in 10–20° Bé. caustic. The sludge ordinarily is only partly soluble, but this is not a disadvantage, since often the insoluble portion of the sludge is desirable as a suspension in the solution to aid in the sweetening reaction. It is therefore practical to utilize the entire sludge when the soluble portion is relatively large. In case the percentage of soluble compounds is low, the insoluble material may be separated from the new solution and again returned to the weathering pit or used as a suspension in caustic as previously mentioned.

The spent doctor solution and sludge from the agitators previously mentioned, are delivered to a separating tank where the sludge may be settled or otherwise conveniently separated from the spent doctor liquor and the latter drawn off.

The sludge, which may be semi-dry or a concentrated suspension, may be treated in various modes. According to one modification, the sludge is delivered to a weathering basin. This basin may be a suitable pit in the ground or other means for maintaining a body or lake of material exposed to sunlight and varying weather conditions.

Weathered sludge consisting of soluble lead compounds and granular insoluble material is delivered to a make-up tank No. 1, where it is mixed with a solution of caustic soda. The caustic alkali dissolves the soluble compounds, leaving the granular material in suspension. The suspended granular material is settled in a settling tank and the clear solution decanted. The latter is then delivered to the doctor solution tank to be used in the sweetening agitators.

The granular insoluble material is passed to a make-up tank No. 2, where it is suspended in aqueous caustic soda of about 10 to 20° Baumé, preferably 13° Baumé. The suspension is conducted to sweetening agitators and there agitated with the oil to be sweetened. If desired, air may be used in these agitators as disclosed in the U. S. patent to Rowsey, No. 1,754,649, granted April 15, 1930. It is preferable in sweetening with such suspension of sludge in caustic to treat an oil which is to be further refined, for example a naphtha that is to be redistilled. This is because a loss in color is often experienced during the sweetening operation.

The sweet naphtha and spent sweetening agent are separated and withdrawn from the agitators to be disposed of as desired. Preferably, this spent sweetening agent is again returned to the separating tank and from thence to the weathering basin, the cycle being repeated indefinitely.

According to another modification of my process, the sludge from the separating tank previously mentioned may be delivered whole or in part to a make-up tank No. 3 as indicated on the chart. In this tank the sludge is suspended in caustic soda, but usually this suspension, either from the limited quantity or the nature of the sludge, is not satisfactory as a sweetening agent. The difficulty is overcome by adding an additional supply of sludge from the weathering basin where a considerable deposit is ordinarily kept. The resulting suspension in make-up tank No. 3 is then delivered to the naphtha sweetening agitators and used in a similar manner as the suspension of granular sludge heretofore described.

Obviously, from the nature of my process, many variations and modifications are possible. While I have described a method of carrying out the process in a somewhat particular manner, I do not wish to limit myself to the details therein specified. It will, therefore, be understood that only such limitations are to be imposed as indicated by the following claims.

I claim:

1. A process of treating lead sludge from spent doctor solutions which comprises separating the lead sludge from the spent doctor solution, exposing said sludge to the air under atmospheric conditions for sufficient time to produce a weathered sludge containing a substantial amount of lead compounds soluble in alkali, and dissolving the soluble compounds in caustic alkali to form a doctor solution suitable for treating light petroleum oils.

2. A process of treating lead sludge from spent doctor solutions which comprises separating the lead sludge from the spent doctor solution and collecting said sludge in a shallow lake, exposing the surface of said lake to weather conditions for at least a month to produce a weathered sludge containing lead compounds soluble in alkali, and mixing the weathered sludge with caustic alkali to form a mixture suitable for sweetening light petroleum oils.

3. A process of treating lead sludge from spent doctor solutions which comprises separating the lead sludge from the spent doctor solution and collecting said sludge in the form of a slurry in a shallow body, exposing said body to air and sunlight under atmospheric conditions of temperature and pressure for a sufficient time to produce a weathered sludge containing a substantial amount of compounds soluble in alkali and dissolving the soluble compounds in caustic soda.

4. A process of treating lead sludge from spent doctor solutions which comprises separating the lead sludge from the spent doctor solution and depositing said sludge in an earthen basin, maintaining a substantial body of sludge in said basin, exposing said body to the atmosphere for several months to weather the sludge and produce soluble lead compounds, withdrawing the weathered product from the basin and mixing the withdrawn material in 10° to 20° Baumé caustic soda to form a mixture for sweetening hydrocarbon oils.

5. A process for recovery of valuable products from spent doctor solutions resulting from the treatment of hydrocarbon oils which comprises separating the spent doctor solution containing suspended sludge from the treated oil, settling the sludge from the spent doctor solution, decanting the spent doctor solution, exposing said sludge to the action of sunlight and varying weather conditions for a period of time sufficient to produce a weathered sludge containing a substantial amount of alkali soluble lead compounds, and mixing said weathered sludge with caustic alkali to form a mixture for treating hydrocarbon oils.

6. A process for recovery of valuable products from spent doctor solutions resulting from the treatment of hydrocarbon oils which comprises separating the spent doctor solutions containing suspended sludge from the treated oil, settling the sludge from the spent doctor solution, decanting the spent doctor solution and exposing a portion of the sludge to the action of sunlight and varying weather conditions for a period of time sufficient to produce a weathered sludge containing a substantial amount of soluble lead compounds, adding caustic alkali to the remainder of said sludge, and adding weathered sludge to the mixture of unweathered sludge and caustic alkali to form a mixture for treating hydrocarbon oils.

7. A process for recovery of valuable products from spent doctor solutions resulting from the treatment of hydrocarbon oils which comprises separating the sludge from the spent solution, weathering said sludge by exposure to sunlight and weather conditions for a sufficient time to convert alkali insoluble lead compounds to a weathered sludge containing a substantial amount of alkali soluble compounds and an insoluble portion, dissolving the soluble compounds in caustic alkali to produce a doctor solution for treating hydrocarbon oils, and separating the insoluble portion of the weathered sludge from said doctor solution.

8. A process for recovery of valuable products from spent doctor solutions resulting from the treatment of hydrocarbon oils which comprises separating the sludge from the spent solution, weathering said sludge by exposure to sunlight and weather conditions for a sufficient time to convert the sludge into a weathered sludge containing a substantial amount of an alkali soluble portion and a granular insoluble portion, dissolving the soluble portion in caustic alkali to produce a doctor solution and suspending the insoluble granular portion in caustic alkali to produce a suspension for sweetening hydrocarbon oils.

9. In a process for the treatment of hydrocarbon oils in which a light hydrocarbon oil is sweetened with a doctor solution in a doctor treating operation and a sweetened oil and a suspension of lead sludge are separately withdrawn, the steps of weathering said sludge by exposure to sunlight and varying weather conditions in an earthen pit to convert alkali insoluble to alkali soluble lead compounds, dissolving the soluble lead compounds in caustic soda to produce a doctor solution for reuse in said treating operation.

10. In a process for the treatment of hydrocarbon oils in which one hydrocarbon oil is sweetened with a doctor solution in a doctor treating operation and a sweetened oil and a suspension of lead sludge are separately withdrawn, the steps of weathering said sludge by exposure to sunlight and varying weather conditions in a weathering basin to convert the lead sludge to an alkali soluble portion and a granular insoluble portion, dissolving the soluble portion in aqueous caustic soda for reuse in said doctor treating operation, and suspending the granular insoluble portion in aqueous caustic soda for separately treating another hydrocarbon oil in another treating operation.

11. A process for recovery of valuable products from spent doctor solutions resulting from the treatment of hydrocarbon oils which comprises separating the lead sludge from the spent doctor liquor, adding aqueous caustic soda to the separated lead sludge to produce a suspension of said sludge in the aqueous caustic solution, simultaneously weathering a deposit of lead sludge from spent doctor solutions by exposure to the atmosphere in a weathering basin, withdrawing weathered sludge from said basin and mixing it with said suspension to produce a treating agent for hydrocarbon oils.

BYRON F. DOOLEY, Jr.